United States Patent
Xu et al.

(10) Patent No.: US 7,483,391 B2
(45) Date of Patent: Jan. 27, 2009

(54) PROVIDING A NOTIFICATION INCLUDING LOCATION INFORMATION FOR NODES IN AN OVERLAY NETWORK

(75) Inventors: Zhichen Xu, San Jose, CA (US); Chunqiang Tang, Rochester, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1075 days.

(21) Appl. No.: 10/666,620

(22) Filed: Sep. 19, 2003

(65) Prior Publication Data

US 2005/0063318 A1    Mar. 24, 2005

(51) Int. Cl.
*H04L 12/28* (2006.01)
(52) U.S. Cl. ............... 370/254; 370/400; 709/220; 709/238
(58) Field of Classification Search .......... None
See application file for complete search history.

(56) References Cited

U.S. PATENT DOCUMENTS

| 4,823,111 A * | 4/1989 | Tsuchiya et al. ............ 370/408 |
| 6,021,406 A * | 2/2000 | Kuznetsov ................... 707/6 |
| 7,123,620 B1 * | 10/2006 | Ma ........................... 370/395.32 |

OTHER PUBLICATIONS

Bolosky, W. et al., "Feasibility of a Serverless Distributed File System Deployed on an Existing Set of Desktop PCs" Jun. 2000.
Castro, M. et al., "Exploiting Network Proximity in Peer-to-Peer Overlay Networks", Jun. 2002.
Dabek, F. et al., "Wide-area Cooperative Storage with CFS", Oct. 2001.
Ng, T.S., et al., "Towards Global Network Positioning", ACM SIGCOMM Internet Measurement Workshop 2001.
Francis, P. et al., "An Architecture for a Global Internet Host Distance Estimation Service", IEEE INFOCOM 1999, p. 210-217.
Karp, B. et al., "GPSR: Greedy Perimeter Stateless Routing for Wireless Networks", Proceedings of ACM Conf. on Mobile Computing and Networking (MOBICOM), 2000.
Kubiatowicz, J. et al., "Oceanstore: An Architecture for Global-scale Persistent Storage", Proceedings of ASPLOS 2000.
Li, J. et al., "A Scalable Location Service for Geographic Ad-hoc Routing", Proceedings of ACM Conf. on Mobile Computing and Networking (MOBICOM), 2000.
Medina, A. et al., "BRITE: Universal Topology Generation from a User's Perspective", Technical Report BUCS-TR-2001.
Ratnasamy, S. et al., "A Scalable Content-Addressable Network", SIGCOMM Aug. 2001.
Ratnasamy, S. et al., "Topologically-Aware Overlay Construction and Server Selection", IEEE Infocom 2002.

(Continued)

*Primary Examiner*—Wing F Chan
*Assistant Examiner*—Brian Roberts (57) ABSTRACT

An overlay network is used to logically represent an underlying physical network. A network condition is monitored by a node in a target region of the network. If the network condition occurs, the node transmits a notification to a source node including location information for nodes physically close in the physical network. The source node may select a routing node in the target region based on the location information.

25 Claims, 10 Drawing Sheets

OTHER PUBLICATIONS

Rowstron, A. et al., "Storage Managment and Caching in PAST, a Large-scale, Persistent Peer-to-Peer Storage Utility", SOSP 2001.

Savage, S. et al., "The End-to-End Effects of Internet Path Selection", ACM SIGCOMM Aug. 1999.

Stoica, I. et al., "A Scalable Peer-to-Peer Lookup Service for Internet Applications", SIGCOMM Aug. 2001.

Tang, C. et al., "PeerSearch: Efficient Information Retrieval in Peer-to-Peer Networks", HotNets 2002.

Waldvogel, M. et al., "Efficient Topology-Aware Overlay Network", HotNets 2002.

Zegura, E. et al., "How to Model an INternetwork" IEEE Infocom 1996.

Xu, Z. et al., "Building Low-maintenance Expressways for P2P Systems", 2001 Hewlett-Packard Labs: Palo Alto.

Xu, Z. et al., "Turning Heterogeneity to an Advantage in Overlay Routing", Jul. 2002.

Zhang, Z. et al. "Self-Balanced Expressway: When Marxism Meets Confucian", Technical report MSR-TR-2002-72.

* cited by examiner

PROVIDING A NOTIFICATION INCLUDING LOCATION INFORMATION FOR NODES IN AN OVERLAY NETWORK

TECHNICAL FIELD

This invention relates generally to network systems. More particularly, the invention relates to using location information of nodes in an overlay network.

BACKGROUND

Recently, distributed hash table (DHT) overlay networks have been used to solve the problem of data placement and retrieval in large scale, Internet-sized storage systems. These systems generally include distributed network systems implemented, for example, using peer-to-peer (P2P) networks for storing vast amounts of data. The overlay networks are logical representations of the underlying physical networks, which provide, among other types of functionality, data placement, information retrieval, routing, etc. Some examples of DHT overlay networks include content-addressable-network (CAN), PASTRY, and CHORD.

Data is represented in an overlay network as a (key, value) pair, such as (K1,V1). K1 is deterministically mapped to a point P in the overlay network using a hash function, e.g., P=h(K1). The key value pair (K1,V1) is then stored at the point P in the overlay network, i.e., at the node owning the zone where point P lies. The same hash function is used to retrieve data. The hash function is used to calculate the point P from K1. Then the data is retrieved from the point P. This is further illustrated with respect to the 2-dimensional CAN overlay network 900 shown in FIG. 9.

Figure 9:
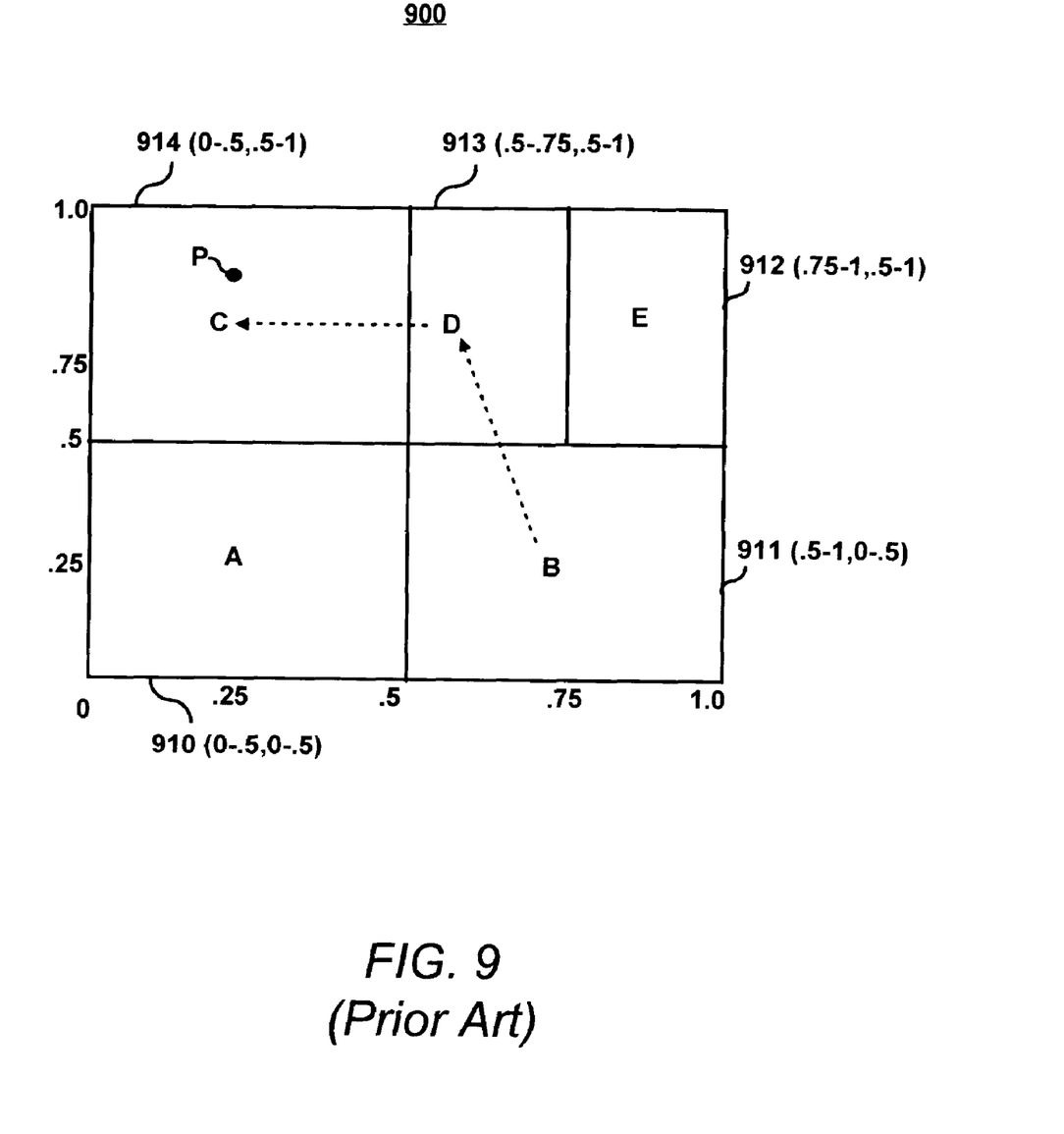
FIG. 9 illustrates a conventional CAN overlay network.

A CAN overlay network logically represents the underlying physical network using a d-dimensional Cartesian coordinate space on a d-torus. FIG. 9 illustrates a 2-dimensional $[0,1] \times [0,1]$ Cartesian coordinate space in the overlay network 900. The Cartesian space is partitioned into CAN zones 910-914 owned by nodes A-E, respectively. The nodes A-E each maintain a coordinate routing table that holds the IP address and virtual coordinate zone of each of its immediate neighbors. Two nodes are neighbors if their zones overlap along d-1 dimensions and abut along one dimension. For example, nodes B and D are neighbors, but nodes B and C are not neighbors because their zones 911 and 914 do not abut along one dimension. Each node in the overlay network 900 owns a zone. The coordinates for the zones 910-914 are shown.

Routing in the overlay network 900 is performed by routing to a destination node through neighboring nodes. Assume the node B is retrieving data from a point P in the zone 914 owned byte node C. Because the point P is not in the zone 911 or any of the neighboring zones of the node B, the request for data is routed through the neighboring zone 913 owned by the node D to the node C owning the zone 914 where point P lies to retrieve the data. Thus, a CAN message includes destination coordinates, such as the coordinates for the point P, determined using the bash function. Using the source node's neighbor coordinate set, the source node routes the request by simple greedy forwarding to the neighbor with coordinates closest to the destination coordinates, such as shown in the path B-D-C.

Without considering proximity information about nodes, CAN and other types of overlay networks operate far less efficiently than what is optimally possible. For example, referring to the CAN overlay network 900, the node B may select the node D when routing to the point P, because node D's coordinates may be closer to the destination than node A's coordinates. However, the number of logical hops in the overlay network 900 may be much less than the number of network hops in the physical network when routing to die destination node. For example, there may be 100 network hops in the path B-D-C and 50 network hops in the path B-A-C. Thus, by not considering the underlying network topology and selecting die path with more network hops, more network traffic is generated and latencies are increased.

SUMMARY OF THE EMBODIMENTS OF THE INVENTION

According to an embodiment, an overlay network is provided that is a logical representation of a physical network. A method of maintaining proximity information in the overlay network includes determining whether a network condition occurred. The method further includes storing proximity information for the region and updating the proximity information, wherein the proximity information includes locations of nodes physically close in the physical network. The proximity information is transmitted in response to the network condition occurring.

According to another embodiment, a method includes selecting a target node in a region in an overlay network, wherein the overlay network is a logical representation of a physical network. The method further includes determining a network condition to be monitored by the target node and receiving a notification from the target node. The notification may include a map for the region, wherein the map includes locations of nodes physically close in the physical network.

According to yet another embodiment, a system includes a plurality of nodes connected via at least one network, wherein an overlay network logically represents the system. The nodes include a target node and a source node. The target node is operable to determine whether a predetermined network condition occurred and transmit a notification to the source node in response to the network condition occurring. The source node is operable to receive the notification and select a routing node in the target region based on the received notification. The received notification may include a map comprising locations of nodes physically close in the physical network.

According to yet another embodiment, a node in an overlay network includes means for selecting a target node in a target region in an overlay network. A means for determining a network condition determines a network condition to be monitored by the target node, and a means for receiving a notification from the target node receives the notification, which may include a map for the region. The map includes locations of nodes physically close in the physical network.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF THE EMBODIMENTS OF THE INVENTION

For simplicity and illustrative purposes, the principles of the embodiments of the invention are described. However, one of ordinary skill in the art would readily recognize that the same principles are equally applicable to, and can be implemented in, all types of network systems, and that any such variations do not depart from the true spirit and scope of the embodiments of the invention. Moreover, in the following detailed description, references are made to the accompanying figures, which illustrate specific embodiments. Electrical, mechanical, logical and structural changes may be made to the embodiments without departing from the spirit and scope of the embodiments of the invention.

Proximity information is used in an overlay network for routing. The proximity information is information related to the location of nodes in the underlying physical network for the overlay network. The proximity information may be generated by measuring distances to landmark nodes. Distance may be measured in terms of a network metric, such a round-trip-time (RTT), network hops, etc.

According to an embodiment, the proximity information may be used to find the closest node in the physical network for routing. In expressway routing CAN (called eCAN which is a hierarchical version of CAN), a closest node in a target region or neighboring region is selected for routing to the target region or neighboring region. By selecting a closest node instead of randomly selecting a node, network traffic and latency may be reduced in the physical network.

According to an embodiment, the placement of proximity information in the overlay network is controlled such that proximity information about nodes that are physically close to each other in the physical network is stored logically close in the overlay network.

According to another embodiment, a node subscribes to proximity information for neighboring regions. As the proximity information changes, for example due to nodes joining or leaving a region of the overlay network, the node gets notified of the updated proximity information.

According to an embodiment, a publish/subscribe functionality is provided in the overlay network. A node may specify an interest in another node or region in the overlay network by specifying a predetermined network condition to the node. The network condition is monitored at the node. If the network condition occurs, the node sends notification regarding the occurrence of the network condition. The notification may include network metrics measured by the node and a map for the region. The proximity information maintained in the overlay network may be used to identify a region or node of interest and to receive notification of the network condition. Also, information in the notification may be used to monitor the node and/or region of the node and to select a routing node in the region. Based on these embodiments, a topology aware overlay network is implemented that may reduce network traffic and latencies and that can respond to network condition changes in a demand-driven fashion.

Figure 1:
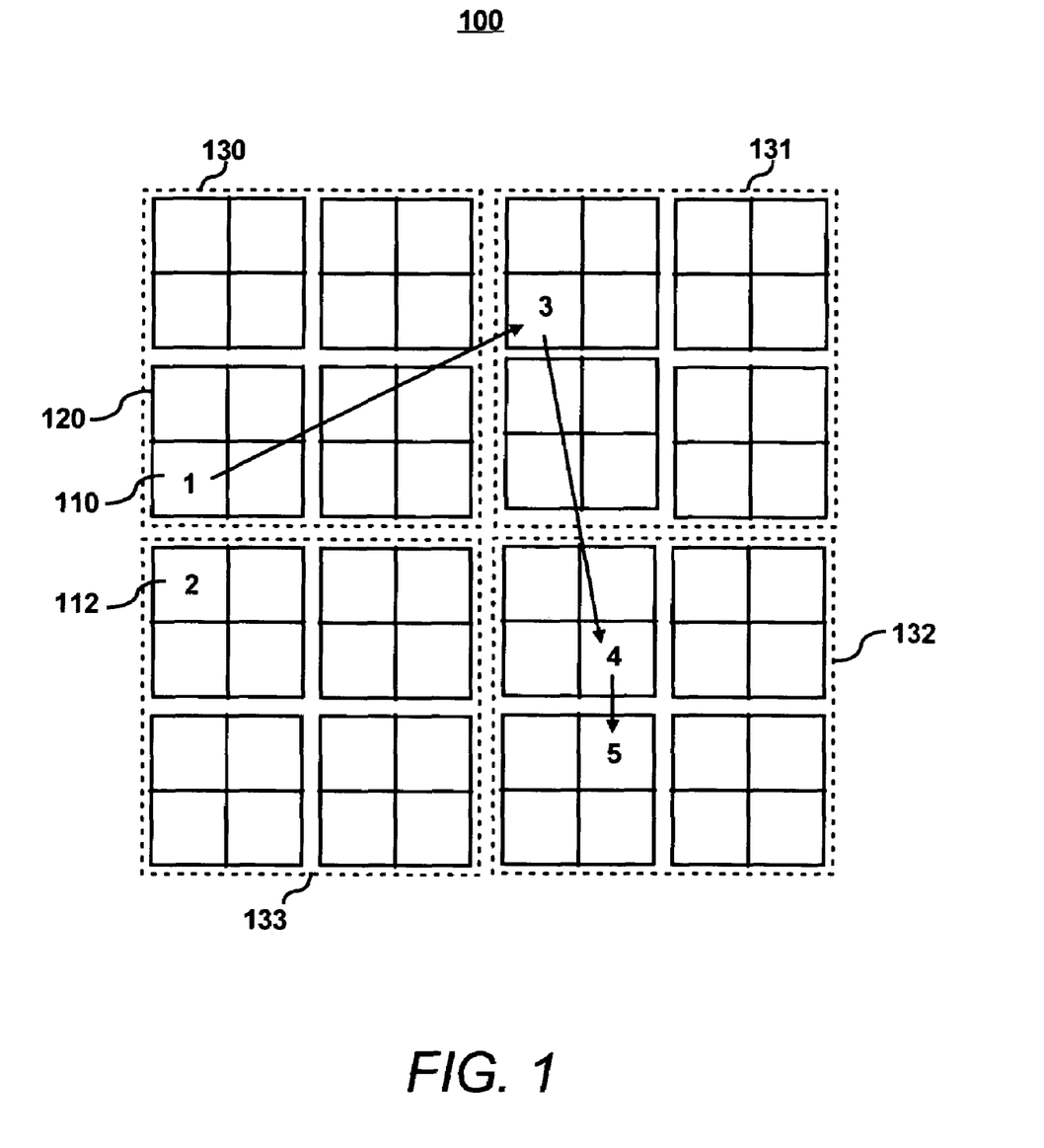
FIG. 1 illustrates an overlay network, according to an embodiment of the invention.

FIG. 1 illustrates an eCAN overlay network 100, according to an embodiment of the invention. The eCAN network is shown by way of example, and not limitation. It will be apparent to one of ordinary skill in the art that the principles of the embodiments of the invention may be practiced in other types of overlay networks, such as CAN, PASTRY CHORD, etc.

The eCAN overlay network 100 augments the principles of a CAN overlay network. The eCAN overlay network 100 augments CAN's routing capacity with routing tables of larger span to improve routing performance. For example, default CAN zones are represented in the eCAN overlay network 100. Each CAN zone, such as the zone 110, is 1/64 of the entire Cartesian coordinate space of the eCAN overlay network 100. The CAN zones are order-1 zones. The eCAN overlay network 100 also represents high-order zones that comprise multiple CAN zones. For example, an order-2 eCAN zone includes four neighboring CAN zones, such as the order-2 eCAN zone 120. Other high-order eCAN zones may also be represented, such as an order-3 eCAN zone that may include four order-2 eCAN zones. Zones 130-133 are order-3 eCAN zones.

A node that is an owner of a CAN zone is also a member of a high-order zone that encompasses the CAN zone. For example, node 1 is the owner of the CAN zone 110. Node 1 is also a member of the high-order zones 120 and 130 that encompass the CAN zone 110. In CAN, a node's routing table includes nodes in neighboring zones. In eCAN, a node's routing table includes the default CAN routing table and in addition routing information for high-order routing neighbors that are representative of its neighbors in the high-order zones. For example, node 1 may include node 2 in its routing table based on CAN routing procedure, because node 2 is in a neighboring order-1 zone 112. The routing table for node 1 may also includes node 3, because node 3 is in the neighboring order-3 zone 131.

The eCAN overlay network 100 also uses expressway routing nodes for expressway routing. Nodes with good connectivity and availability elect themselves as expressway routing nodes and publish that information to other nodes in the overlay network. For example, nodes 3 and 4 may be expressway routing nodes in the eCAN overlay network 100. An example of a routing path in the eCAN overlay network 100 is shown. If node 1, a source node, desires to transmit a message to node 5, a destination node, the path may include nodes 3, 4, and 5. In a CAN overlay network, the message is transmitted to a node in each neighboring CAN zone before reaching the destination node. Thus, the eCAN overlay network 100 may significantly reduce network traffic and latency by representing high-order zones and using expressway routing nodes. The eCAN overlay network is further described in U.S. patent application Ser. No. 10/231,184, entitled, "Expressway Routing Among Peers", filed on Aug. 29, 2002 and hereby incorporated by reference in its entirety.

According to an embodiment, landmark nodes are used to generate proximity information for regions in the overlay network. A region may include a portion of the overlay network. For example, in the eCAN overlay network 100, a region may include a portion of the Cartesian space, such as a high-order zone. Each of the order-3 zones, including the zones 130-133, may be a region. In a PASTRY overlay network, a region may include sharing a particular prefix. For each region, a map is constructed. The map includes proximity information stored in the region, and the map is stored in each of the nodes in the region. When such maps are available, any node can find its physically closest neighbor in a neighboring region by consulting the map of the neighboring region.

Proximity information is information related to the location of nodes in the underlying physical network for the overlay network. According to an embodiment, proximity information is determined using landmark nodes and determining distances to the landmark nodes. Distance may be measured in terms of a metric, such as network hops, round trip time (RTT) for a message to travel from the source node to a landmark node and back, etc. RTT is used in the description below by way of example, and not limitation.

Figure 2A:
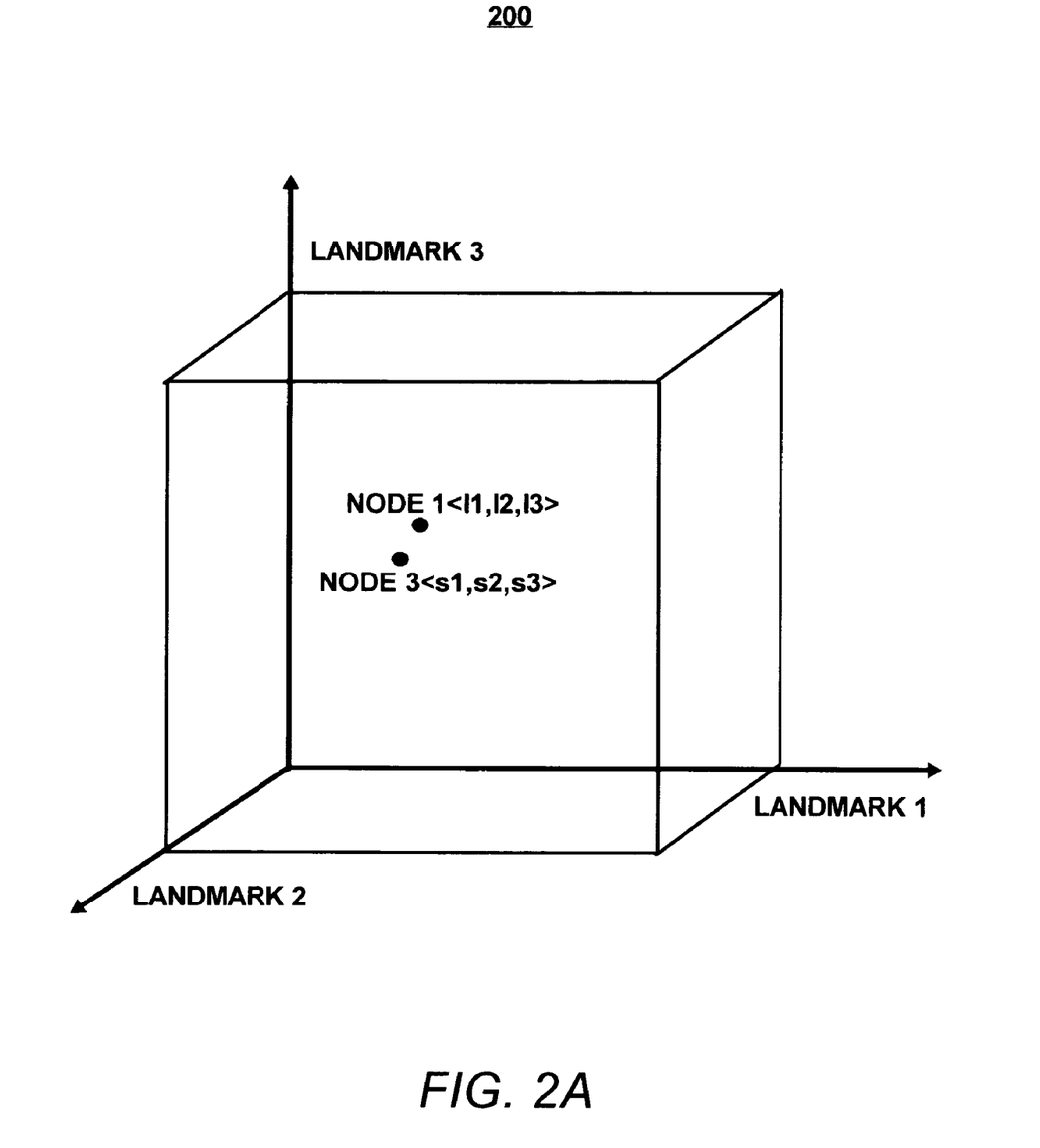
FIG. 2A illustrates nodes in a landmark space, according to an embodiment of the invention.

According to an embodiment, a node's location in the physical network is represented using a landmark space. A landmark space is a logical representation of the physical network in a coordinate space, similar to the overlay network. FIG. 2A illustrates a landmark space 200, according to an embodiment of the invention. A number of nodes n in the physical network are randomly selected. These are the landmark nodes. The number of dimensions of the Cartesian landmark space 200 is equal to the number of landmark nodes. The landmark space 200 is three dimensional, assuming three landmark nodes were selected.

Each node in the overlay network measures its distance to the n landmark nodes. A landmark vector with n elements is generated for each node, wherein each element is a distance to one of the landmark nodes. Referring to FIG. 2A, landmark vectors for the nodes 1 and 3 from FIG. 1 are shown in the landmark space 200 of FIG. 2A. The landmark vector for node 1 is shown as <11, 12, and 13>, where 11-13 represent distances to the landmark nodes, and the landmark vector for node 3 is shown as <s1, s2, and s3>, where s1-s3 represent distances to the landmark nodes. The nodes 1 and 3 are positioned in the landmark space at the coordinates provided in their landmark vectors. Thus, nodes close to each other in the landmark space 200 are close in the physical network.

When determining the number of landmark nodes to be used for determining location information for the nodes in the overlay network, a sufficient number of landmark nodes may be used to reduce the probability of false clustering where nodes that are far away in network distance tend to be clustered close to each other in the landmark space. As a result, the number of dimensions of the landmark space is typically higher than the number of dimensions for the overlay network. Thus, a hash function is used to translate physical node location information (e.g., landmark vectors) from the landmark space to the overlay network, such that points close in the landmark space are mapped to points that are close in the overlay network.

Figure 2B:
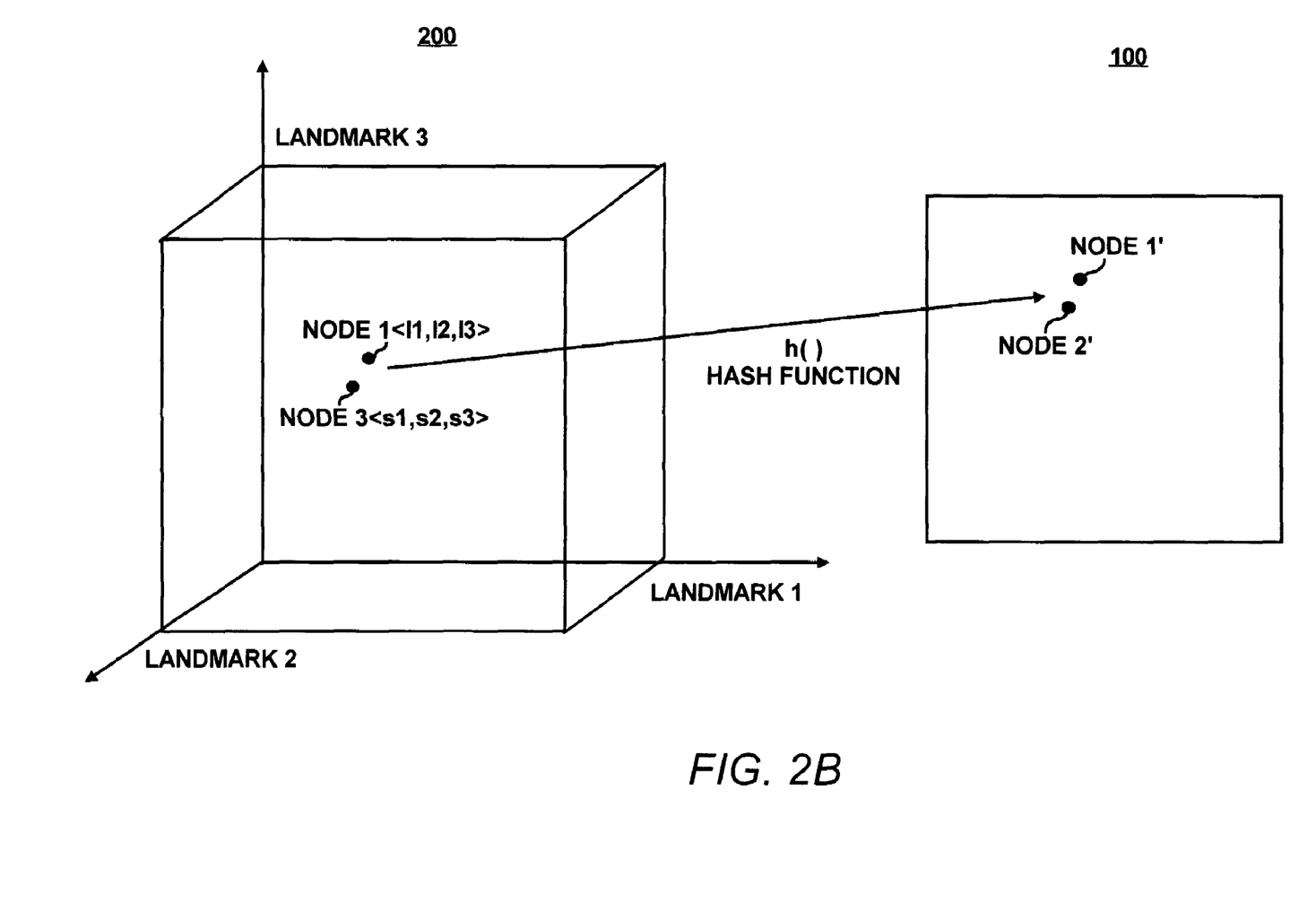
FIG. 2B illustrates storing proximity information in locations in the overlay network, according to an embodiment of the invention.

The hash function is used to determine a point p' in the overlay network that corresponds to a point p in the landmark space. The hash function is represented as p'=h(p, dp, dz, z), where dp is the dimension of p (p being a point in the landmark space, such as shown for nodes 1 and 3 in the landmark space 200), z is the region where the proximity information is about to be stored (e.g., zone 131 shown in FIG. 1), dz is the dimension of the region z (e.g., 2 for the overlay network 100 shown in FIG. 1), and p' is a point in the region z. If the points for the nodes 1 and 3 in the landmark space 200 are close, the p' points for the nodes 1 and 3 in the overlay network are also close in the region z. Thus, the map for the region z includes proximity information for the nodes 1 and 3. For example, node 1' is the point in the eCAN overlay network 100 for node 1 associated with the point for node 1 in the landmark space 200 shown in FIG. 2A. Proximity information for the node 1 is stored at the node in eCAN overlay network 100 that owns the zone where the point node 1' is located. The proximity information stored at the node may include the triple <z,n,p>, where z is the region, n is the node 1 (e.g., node ID), and p is the landmark vector for node 1 in the landmark space 200. FIG. 2B illustrates the proximity information for the nodes 1 and 3 being stored in the eCAN overlay network 100. A high-level representation of the eCAN overlay network 100 is shown in FIG. 2B. Note that the proximity information for nodes 1 and 3, such as node 1' and node 3', is closely located in the eCAN overlay network 100 similarly to the close physical locations represented in the landmark space 200. The controlled placement of the proximity information in the overlay network, according to the embodiments of the invention, allows the map for a region to be stored in a fraction of the region it covers (e.g., the map is stored in each node in the region which owns a fraction of the region), especially when a region is a high-order zone. The ratio of map size to the size of the hosting zone storing the map is the condense rate of the coordinate map. Because of the condense rate, a large amount of proximity information may be discerned from a single node. Therefore, the amount of map lookup requests that need to be performed may be reduced.

As described above, a hash function is used to determine a point p' in the lower dimension overlay network that corresponds to a point p in the higher dimension landmark space. The hash function may use a space-filling curve to map points from a higher dimension space into a lower dimension space. If two points are close to each other in the higher dimensional space, the points are mapped to two points close to each other in the lower dimensional space using the space-filling curve. One example of well known recursive space-filling curve is the Hilbert curve, which may be used for the hash function.

Figure 3A:
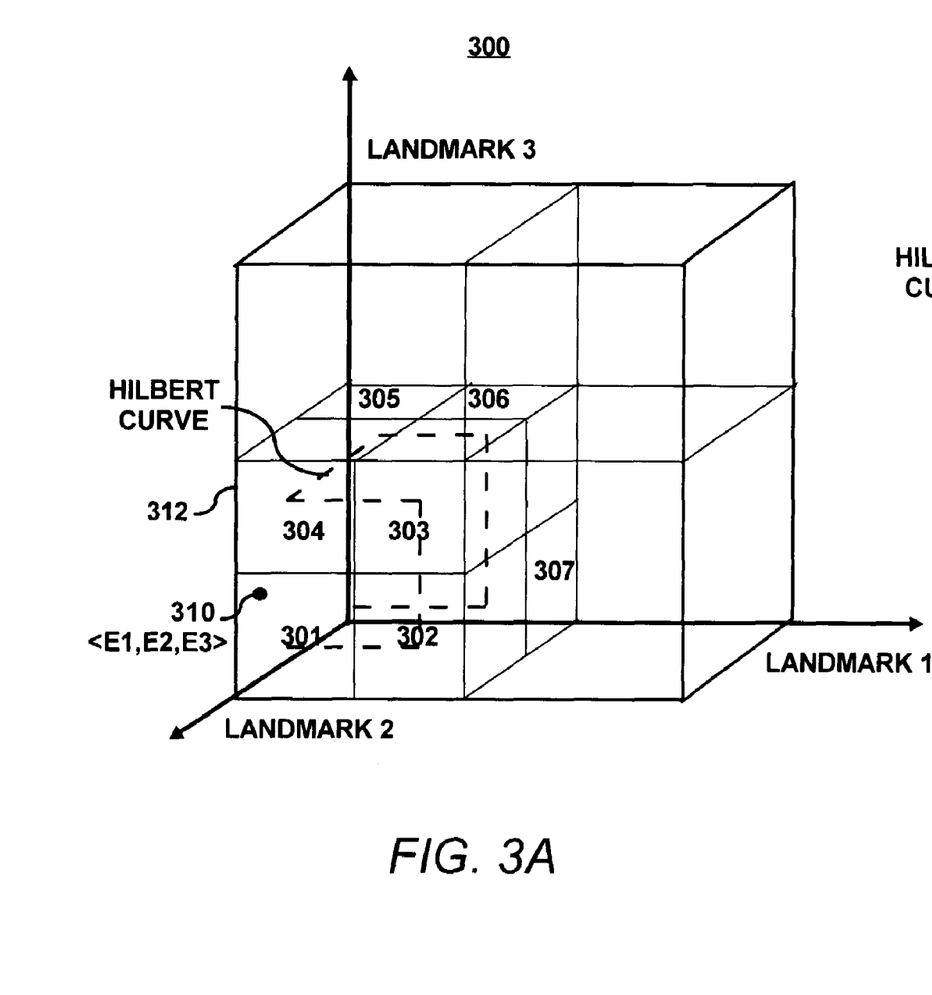
FIGS. 3A-B illustrate mapping points from a landmark space to an overlay network using a space filling curve, according to an embodiment of the invention.
Figure 3B:
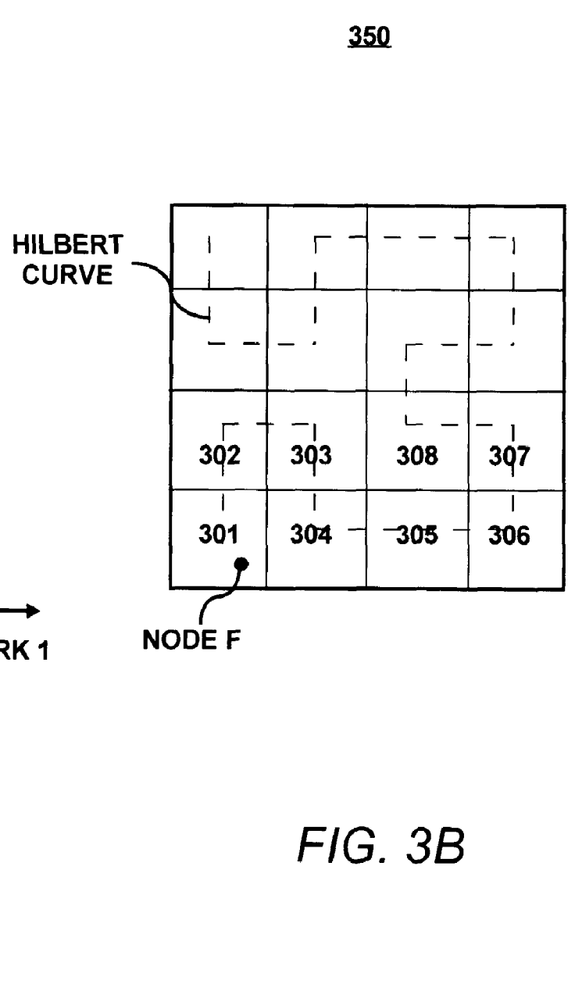

Use of landmark numbers and the hash function is further described with respect to FIGS. 3A-B. FIGS. 3A-B illustrate using a Hilbert space filling curve to map landmark numbers in a three-dimensional landmark space 300 into a two-dimensional overlay network. The landmark space 300 is divided into $2^{nx}$ grids of equal size (such as shown for section 312 of the landmark space 300), where n refers to the number of landmark nodes in the landmark space 300 and x controls the number of grids used to partition the landmark space 300. Each grid is assigned a landmark number (e.g., landmark numbers 301-308), and each node located in section 312, which may include expressway routing nodes for eCAN, is numbered according to the grid into which it falls. The landmark numbers can be used as keys to identify locations of nodes in the overlay network storing proximity information by hashing the keys. The entire landmark vector or a subset of the entire landmark vector, called a landmark vector index, may be used to determine which grid of the landmark space 300 a node falls into (i.e., which landmark number is assigned to a node in the landmark space 300). Closeness in landmark number indicates physical closeness in the network. Also, the smaller the value of x, the larger the likelihood that two expressway routing nodes will have the same landmark number and the greater the accuracy of the physical proximity information.

A space filling curve, such as the Hilbert curve (although other known space filling curves may be used), is used to map the three-dimensional landmark space 300 to a region 350, shown in FIG. 3B, in a two-dimensional overlay network. For CAN or eCAN, the region 350 is partitioned into grids, again using the Hilbert space filling curve. FIG. 3B illustrates the landmark numbers 301-308 from the landmark space 300 mapped onto the grids in the region 350 of the overlay network. Proximity information about a node is stored in a grid depending on its landmark number. For example, a point 310 is shown in the grid for landmark number 301 in the landmark space 300 shown in FIG. 3A. Assume point 310 is the landmark vector for an expressway routing node E. Proximity information for the node E is stored at the node F, shown in FIG. 3B, which owns the zone in the region 350 where the grid for the landmark number 301 is located in the overlay network. The landmark number for node 5 (e.g., 301) may be used as a key to determine the node F in the region 350 that is used to store proximity information for the node E. In the case of CHORD, the landmark number may be used as a key to store the proximity information of an expressway routing node on a node whose ID is equal to or greater than the landmark number. In the case of PASTRY, a prefix of the node ID is used to partition the logical space into grids.

Figure 4:
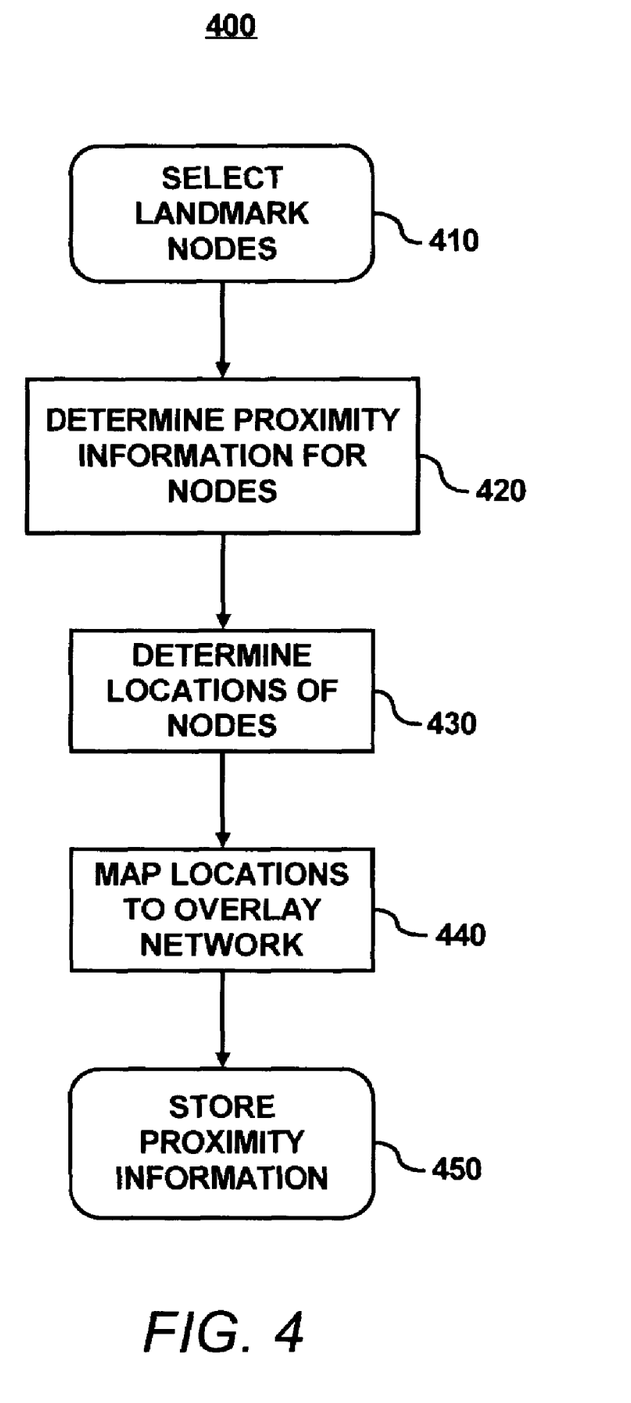
FIG. 4 illustrates a flow chart of a method for placing proximity information in an overlay network, according to an embodiment of the invention.

FIG. 4 illustrates a method 400 for placing proximity information in an overlay network, according to an embodiment of the invention. It should be readily apparent to those of ordinary skill in the art that the method 400 represents a generalized illustration and that other steps may be added or existing steps may be removed or modified. At step 410, landmark nodes are selected in the physical network. The number of landmark nodes selected is dependent on the size of the network. The larger the network, the greater the number of landmark nodes that need to be selected to accurately determine physical location information for nodes in the network. The landmark nodes may be randomly selected from nodes in the overlay network or standalone nodes.

At step 420, proximity information for the nodes in the overlay network are determined. This may include measuring distances from nodes in the network to the landmark nodes. Distance from each node to each landmark node are measured based on a network metric, such as RTT, network hops, etc. For example, each node may determine an RTT to each landmark node and store this information as a landmark vector. At step 430, locations for the nodes in the physical network are determined based on the distances determined at step 420. The locations may include the landmark vectors determined for each node, such as described with respect to the landmark space 200 shown in FIG. 2A.

At step 440, the locations for the nodes determined at step 430 are mapped to the overlay network. This may include using a landmark vector or a landmark number of a node as a key to determine a location in the overlay network for storing the proximity information. A node may hash its key to a point P' in the overlay network using a hash function. In one embodiment, the hash function includes a space filling curve for mapping n-dimensional landmark vectors to an m-dimensional overlay network, where n>m.

At step 450 proximity information for the nodes are stored in the overlay network, such that proximity information for nodes physically close together are stored logically close together in the overlay network. For example, FIG. 2B illustrates landmark vectors for nodes 1 and 3 that are relatively close. FIG. 2B also illustrates storing proximity information for the nodes 1 and 3 relatively close in the overlay network 100. Also, a map is generated for each region in the overlay network including proximity information for the region. The map is stored at each node in the region.

After the proximity information is stored in the overlay network, for example, as maps for each region, the proximity information may be used for routing to the physically closest node, also referred to as a routing node. Thus, routing in the overlay network takes into consideration the topology of the underlying physical network, which may result in reduced network traffic and latency.

Figure 5:
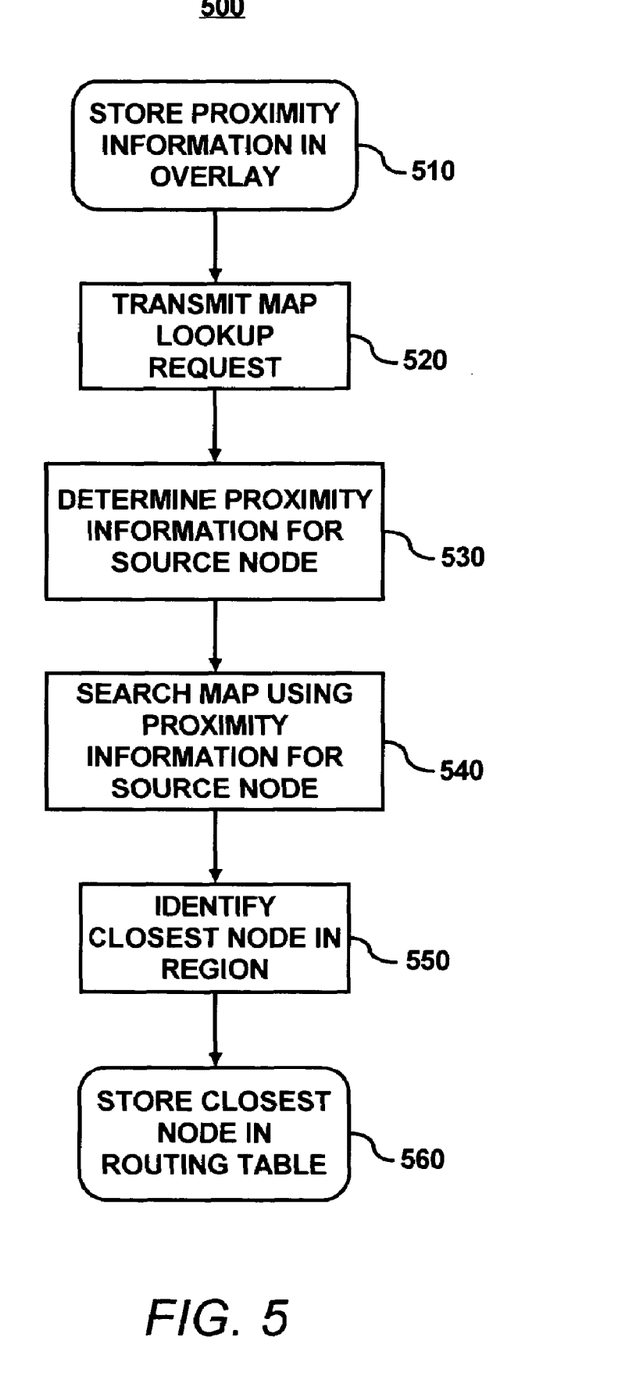
FIG. 5 illustrates a flow chart of a method for determining a closest node, according to an embodiment of the invention.

FIG. 5 illustrates a method 500, according to an embodiment of the invention, for determining a closest node. The method 500 is described with respect to FIG. 1, by way of example, and not limitation. Furthermore, it should be readily apparent to those of ordinary skill in the art that the method 500 represents a generalized illustration and that other steps may be added or existing steps may be removed or modified. At step 510, proximity information for the nodes is stored in the overlay network, such as described in the method 400.

At step 520, a source node, which may include any node in the overlay network including an expressway routing node, transmits a map lookup request to a node in a region, which may include a neighboring region or other region. Referring to FIG. 1, assume node 1, e.g., the source node, is an expressway routing node in region 130, which is a high-order zone in the eCAN overlay network 100. Node 1 needs to route a message to the region 131, a neighboring region, to reach a destination node. Node 1 determines its landmark vector (e.g., node 1 <11, 12, 13>, shown in FIG. 2). Node 1 maps its landmark vector to a point node 1', for example, by hashing the landmark vector or landmark number for node 1 to determine the point node 1' in the overlay network. A map lookup request is transmitted to the node owning the zone where the point node 1' is located in the region (e.g., high order zone 131 shown in FIG. 1). The map for the high-order zone 131 is transmitted back to node 1.

At step 530, the source node determines its proximity information, such as the landmark vector for node 1. At step 540, the source node searches through the map for the region using its proximity information to find a node in the region physically closest to the source node (step 550). The source node may compare proximity information for each node in the map to proximity information for the source node to identify the physically closest node in the region to the source node. For example, the map may include triples <z, n, p> as proximity information for each node in the map, where z is the region, n is the node, and p is the landmark vector for the node. Node 1 indexes the map for the high-order zone 131 using its landmark vector to identify an expressway routing node physically closest to the node 1. The result of the indexing may include node 3 as an expressway routing node closest to the node 1 in the region or high-order zone 131.

At step 560, the physically closest node identified at step 550 is stored in the routing table for the region. For example, if node 3 is identified at step 530, node 1 stores node 3 in node's 1 routing table as the expressway routing node for the high-order zone 131. Thus, expressway routing node 1 routes to the expressway routing node 3 to reach a destination node, which may be located in the high-order zone 131 or another high-order zone in the overlay network 100.

The method 500 may be performed for identifying expressway routing nodes in the neighboring regions. For example, the expressway routing node 1 in the high-order zone 130 shown in FIG. 1 performs the steps of the method 500 to identify expressway routing nodes in the neighboring high-order zones 131 and 133. The expressway routing nodes identified for the high-order zones 131 and 133 may then be used to route to the high order zoned 131-133 from the expressway routing node 1.

The physical network is dynamic and as a result the overlay network is also dynamic. Nodes may be continually added (joined) or removed (departed) from a region in the overlay network. For example, in P2P file-sharing, storage systems, like MORPHEUS and NAPSTER, nodes or peers are continually joining and departing from the network. Because of the dynamic nature of the overlay network, a node may periodically check a neighboring region's map to see whether more favorable nodes are available, such as a node physically closer in the region than a previously identified routing node. Checking of a map may be performed in a demand-driven fashion, such as in response to predetermined network conditions occurring.

Also, a node may desire to monitor network conditions at a node of interest (i.e., a target node) and/or a region of interest (i.e., target region) in the overlay network, which may include a region where the target node is located. For example, to better balance network traffic based on each node's capacity and current load, a node may periodically publish these statistics along with its proximity information. A node receiving the published statistics, such as forwarding capacity and current load, may consider the statistics as well as distance to the node (i.e., closest physical node) when selecting a routing node in the target region. If a node is concerned with QoS, the node may subscribe not only to proximity information, such as a map of the region, but also to the statistics, specifying the conditions under which it should be notified, e.g., "the selected neighbor is handling 80% of its maximum load capacity". When such a condition occurs, a new routing node for the region may be selected based on received statistics or measured network metrics for a node in the target region and based on a map for the target region. The advantages of storing proximity information can be applied to many applications, such as information storage, load balancing, congestion control, meeting quality of service (QoS) guarantee, taking advantage of heterogeneity in storage capacity and forwarding capacity, etc.

Figure 6:
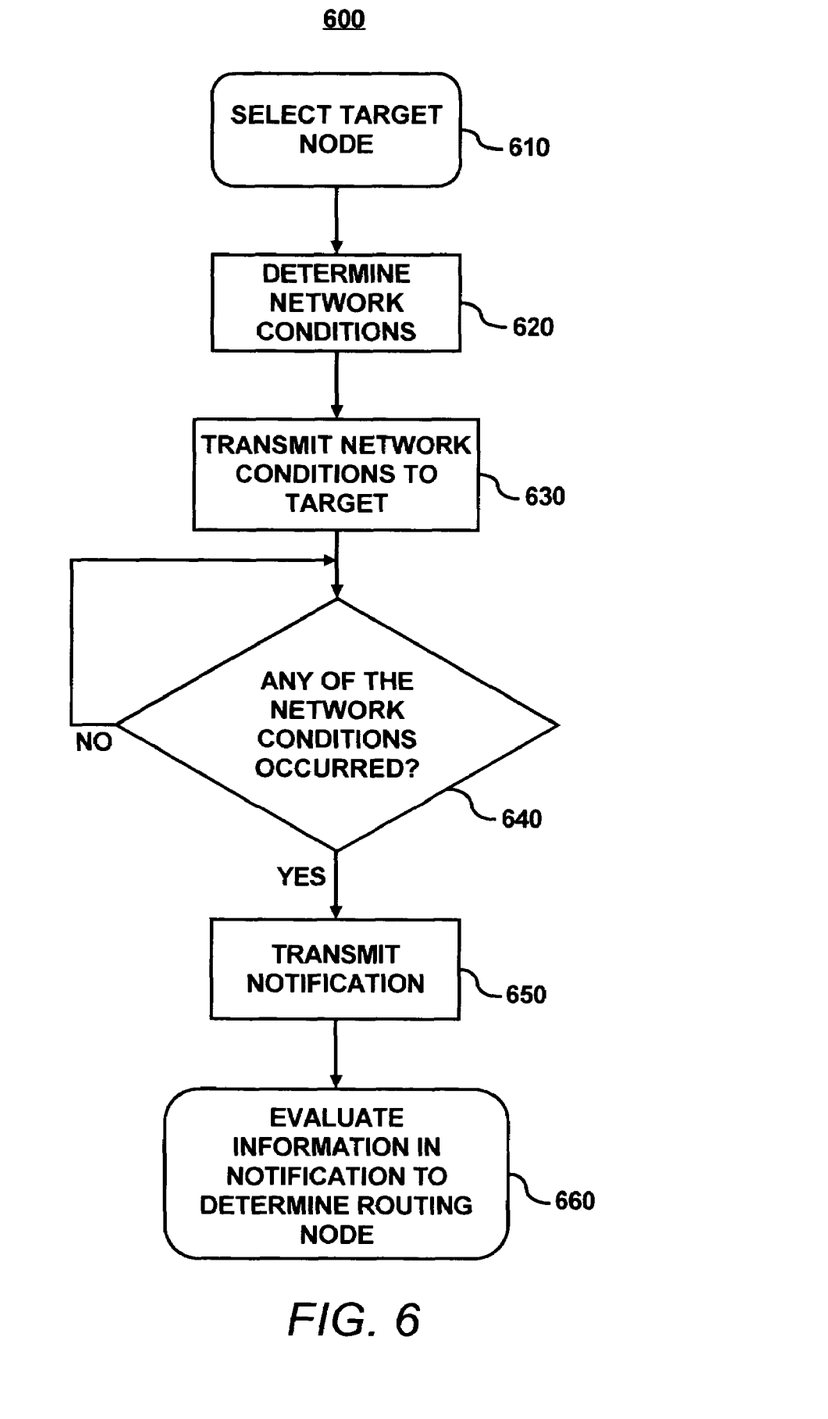
FIG. 6 illustrates a flow chart of a method for providing a notification in response to detecting a network condition, according to an embodiment of the invention.

FIG. 6 illustrates a method 600, according to an embodiment of the invention, for receiving notification if a network condition occurs in the overlay network. The method 600 is described with respect to FIG. 1, by way of example, and not limitation. Furthermore, it should be readily apparent to those of ordinary skill in the art that the method 600 represents a generalized illustration and that other steps may be added or existing steps may be removed or modified. At step 610, a node (referred to as the source node) selects a target node of interest. The target node may include a node in a neighboring region that is currently a routing node. For example, the expressway routing node 3 of FIG. 1 may have been selected by the expressway routing node 1 for routing to the region 131. The expressway routing node 1 may then desire to monitor the expressway routing node 3 to determine whether, for example, due to network changes, the expressway routing 3 becomes less optimal for routing to the region 131. Regions and nodes, other than neighboring regions and nodes in neighboring regions, may be selected as a target node or a target region of interest.

At step 620, the source node determines one or more network conditions that would invoke notification by the target node if the target node determines that any of the network conditions occurred. At step 630, the source node transmits the network conditions to the target node. At step 640, the target node determines whether any of the network conditions have occurred. For example, the expressway routing node 1 in FIG. 1 may desire to receive notifications of network metrics, e.g., current load, forwarding capacity, etc., for the expressway routing node 3. The expressway routing node 3 may continually measure the network metrics. If any of the network conditions occurred, the expressway routing node transmits the measured network metrics to the expressway routing node 1. The network conditions, for example, may include the load of the expressway routing node 3 being greater than a threshold or falling below a threshold, the forwarding capacity of the expressway routing node falling below a threshold, a predetermined number of nodes joining or departing from the region of the expressway routing node 3, lapse of a predetermined period of time (e.g., such that notifications of the measured networks are periodically transferred to the expressway routing node I), etc.

At step 650, the target node transmits a notification to the source node if any of the network conditions occur. The notification may include one or more of the measured network metrics. The measured network metrics may be related to the network conditions or may include other network metrics. Examples of network metrics may include the load of the target node, the forward capacity of the target node, etc. The notification may also include a map for the target region. The map may be updated to reflect changes in proximity information due to joining and/or departing nodes. For example, if a predetermined number of nodes have joined or departed since an initial period in time, the map for the target region is updated to reflect the change in nodes in the target region. The map and/or the network metrics are transmitted to the source node, where they may be used by the source node to select a new routing node in the target region.

At step 660, the source node evaluates the information in the notification to determine whether a new routing needs to be selected. For example, if the notification from the target node indicates that the load is greater than a threshold or the forwarding capacity is below a threshold, the source node may select a new routing node for the target region. Also, if a predetermined number of nodes have joined or departed from the target region, the source node may re-identify a closest node in the target region using, for example, the method 500. A new routing node if selected is placed in the routing table of the source node for routing to the target region.

The method 600 may be used by a plurality of source nodes, which may include nodes in different regions, to subscribe to a target node by specifying network conditions to the target node. If a network condition occurs, the target node publishes measured network metrics and a map of the target region to the subscribing source nodes. The source nodes may subscribe to multiple target nodes and can use the information published from the target nodes to select better routes in the overlay network.

The methods 400-600 are generally described above with respect to an eCAN overlay network. However, it will be apparent to one of ordinary skill in the art that the methods 400-600 are applicable to other types of overlay networks, such as CAN, PASTRY, CHORD, etc. Also, the methods 500 and 600 are generally described above with respect to monitoring neighboring regions and maintaining routing tables based on the physical network topology of the overlay network. However, the methods 500 and 600 are not limited to monitoring neighboring regions and may be used to monitor regions or nodes in any part of the network. For example, the expressway routing node 1 of FIG. 1 may have an interest in the region 132, which is not a neighboring region. The expressway routing node may use the steps of the method 500 to identify a closest node in the region 132. Also, the expressway routing node 1 may have an interest in the node 5 in the region 132. The expressway routing node 1 may use the steps of the method 600 to monitor network conditions for the node 5.

Figure 7:
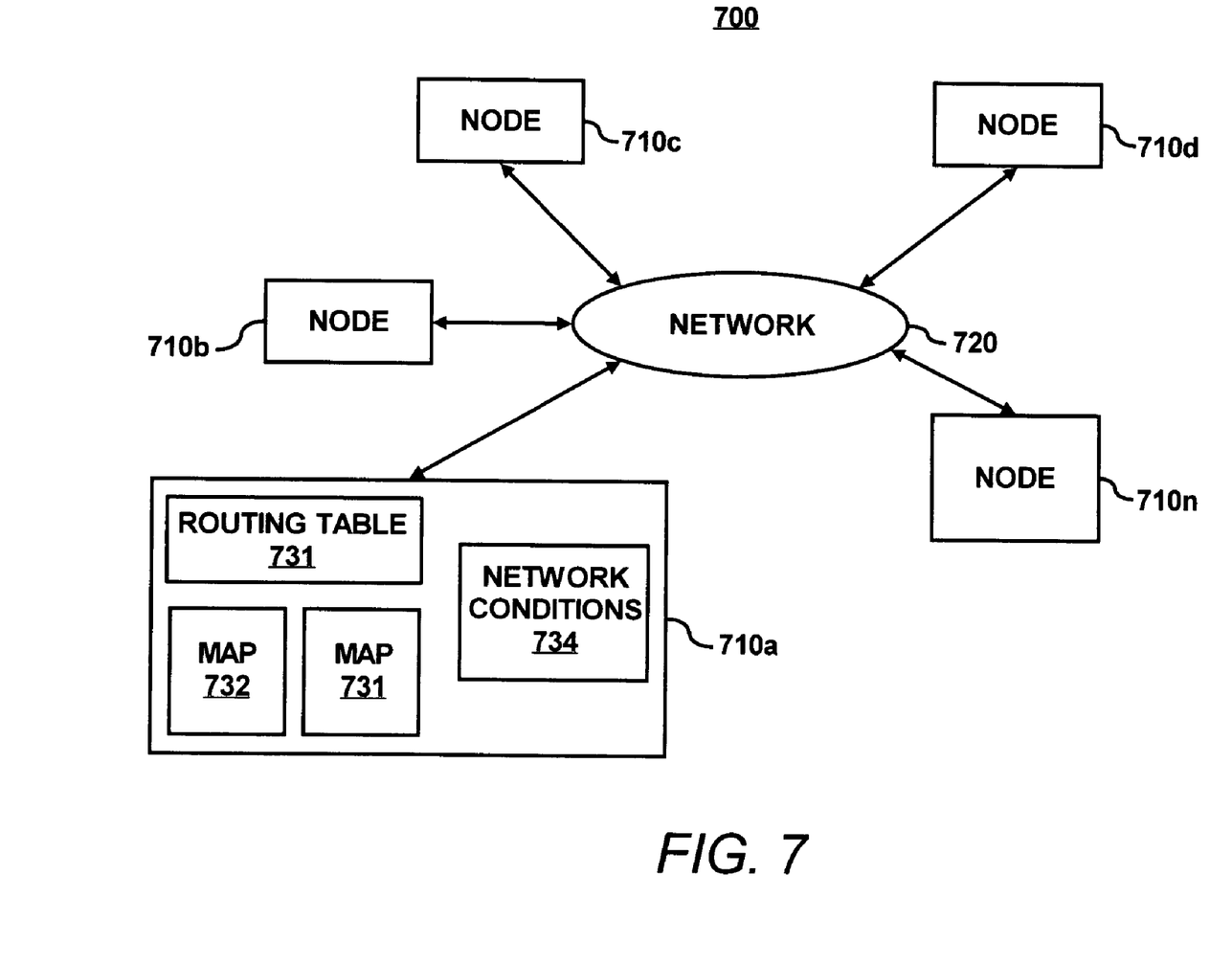
FIG. 7 illustrates an underlying physical network for an overlay network, according to an embodiment of the invention.

FIG. 7 illustrates a physical network 700, according to an embodiment of the invention, which may be used as the underlying physical network for an overlay network implementing one or more of the embodiments of the invention. It should be readily apparent to those of ordinary skill in the art that the network 700 represents a generalized schematic illustration and that other components may be added or existing components may be removed or modified without departing from the spirit or scope of the present invention.

The network 700 includes a plurality of nodes 710a . . . 710n functioning as peers in a P2P system. The nodes 710a . . . 710n may be operable to exchange information among themselves and with other network nodes over a network 720. The nodes 710a . . . 710n may also be operable to determine which nodes 710a . . . 710n are valid and perform other functions (object search and retrieval, object placement, etc.) of a peer in a P2P system. Objects may include files, URLs, etc. The nodes 710a . . . 710n may be computing platforms (e.g., personal digital assistants, laptop computers, workstations, servers, and other similar devices) that have a network interface. The nodes 710a . . . 710n may be further operable to execute one or more software applications (not shown) that include the is capability to share information (e.g., data, applications, etc.) in a P2P manner.

The network 720 may be operable to provide a communication channel among the nodes 710a . . . 710n. The network 720 may be implemented as a local area network, wide area network or combination thereof. The network 720 may implement wired protocols, such as Ethernet, token ring, etc., wireless protocols, such as Cellular Digital Packet Data, Mobitex, IEEE 801.11b, Bluetooth, Wireless Application Protocol, Global System for Mobiles, etc., or combination thereof.

Some of the information that may be stored in the nodes 710a . . . n is shown for node 710a. The node 710a stores a routing table 731, a map 732 for its region, and a map 733 for a neighboring region. The node 710a may use the map 733 to select a physically close node for routing to the neighboring region. The node 710a may also store network conditions 734. If any of the network conditions 734 occurs, for example, due to changes in the network 700, the node 710a updates the map 732 for its region and transmits the updated map and/or measured network metrics to another one of the nodes 710b . . . n monitoring the network conditions of the node 710a, such as described with respect to the method 600. The updated map 732 and/or the measured network metrics may be used to select a physically closer node for routing to the region of the node 710a. The network 700 is described as a P2P system, but the embodiments of the invention may be practiced in other types of networks, including distributed networks.

Figure 8:
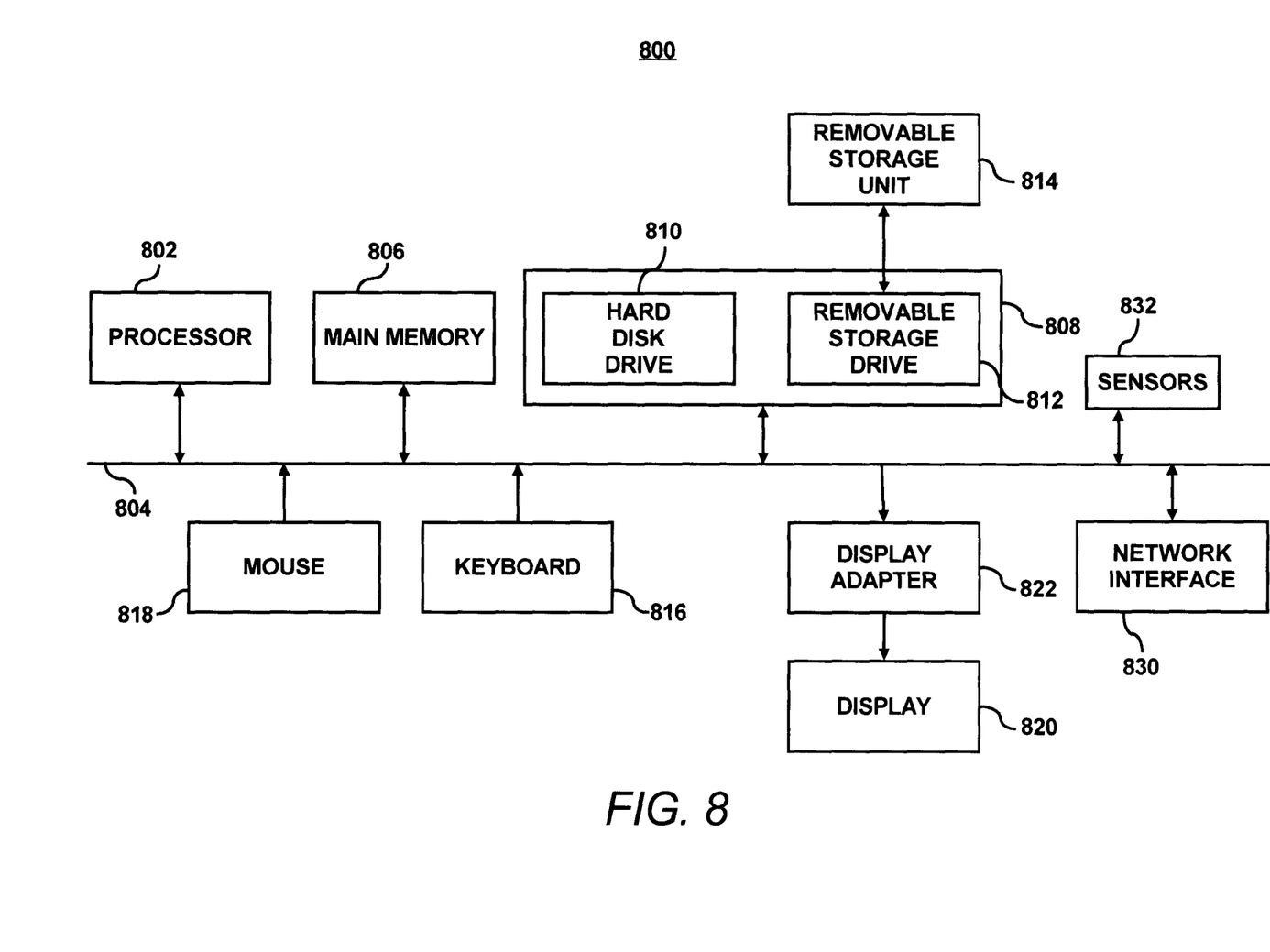
FIG. 8 illustrates a block diagram of a node, according to an embodiment of the invention.

FIG. 8 illustrates an exemplary block diagram of a computer system 800 that may be used as a node in the network 700 shown in FIG. 7. The computer system 800 includes one or more processors, such as processor 802, providing an execution platform for implementing the methods 400-600. Many of the steps of the methods 400-600 may be implemented as software executed on the computer system 800. Commands and data from the processor 802 are communicated over a communication bus 804. The computer system 800 also includes a main memory 806, such as a Random Access Memory (RAM), where software may be executed during runtime, and a secondary memory 808. The secondary memory 808 includes, for example, a hard disk drive 810 and/or a removable storage drive 812, representing a floppy diskette drive, a magnetic tape drive, a compact disk drive, etc., or a nonvolatile memory where a copy of the software may be stored. Also, routing tables, maps, network conditions and measured network metrics may be stored in the main memory 806 and/or the secondary memory 808. The removable storage drive 812 reads from and/or writes to a removable storage unit 814 in a well-known manner. A user interfaces with the computer system 800 with a keyboard 816, a mouse 818, and a display 820. The display adaptor 822 interfaces with the communication bus 804 and the display 820 and receives display data from the processor 802 and converts the display data into display commands for the display 820. A network interface 830 is provided for communicating with other nodes via the network 720 shown in FIG. 7. Also, sensors 832 are provided for measuring network metrics for the node, which may include forward capacity, load, etc.

While the invention has been described with reference to the exemplary embodiments thereof, those skilled in the art will be able to make various modifications to the described embodiments without departing from the true spirit and scope. For example, it will be apparent to one of ordinary skill in the art that the advantages of storing proximity information as described herein can be applied to many applications, such as information storage, load balancing, congestion control, meeting quality of service (QoS) guarantee, taking advantage of heterogeneity in storage capacity and forwarding capacity, etc. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of maintaining proximity information in an overlay network, wherein the overlay network is a logical representation of a physical network, the method comprising:
   determining whether a network condition occurred, the network condition being associated with a region in the overlay network;
   determining distances of each of a first plurality of nodes in the physical network to each of a second plurality of landmark nodes in the physical network, the first plurality of nodes comprising a first node, and the landmark nodes being different from the first plurality of nodes;
   storing a proximity information in the region, wherein the proximity information includes locations of the first plurality of nodes the physical network;
   updating the proximity information stored in the region if a change associated with the first plurality of nodes in the physical network occurred; and
   transmitting the proximity information to the first node operable to route a message to the region in response to the network condition occurring, wherein the first node obtains the distances of each of the first plurality of nodes to each of the second plurality of landmark nodes.

2. The method of claim 1, further comprising:
   selecting a routing node in the region based on the proximity information transmitted to the first node;
   determining whether the selected routing node is different than a previously selected routing node for the region; and
   placing the selected muting node in a routing table for the first node in response to the selected routing node being different than the previously selected routing node.

3. The method of claim 2, wherein selecting a routing node comprises identifying a node in the region physically closest to the first node based on the proximity information transmitted to the first node.

4. The method of claim 1, wherein the network condition comprises one or more of a predetermined number of nodes joining the region; a predetermined number of nodes departing from the region; a lapsing of a predetermined period of time, a load of a node in the region exceeding a threshold or falling below a threshold, and a forward capacity of the node in the region filling below a threshold.

5. The method of claim 1, further comprising the first node identifying the network condition to be monitored.

6. The method of claim 1, further comprising generating the proximity information stored in the region by determining distances of substantially all the nodes in the overlay network to landmark nodes.

7. The method of claim 1, wherein storing the proximity information further comprises:
   determining points in the overlay network used to store the proximity information by mapping the locations of the first plurality of nodes in the physical network to logical points in the overlay network using a space-filling curve.

8. The method of claim 1, wherein transmitting the proximity information further comprises transmitting at least one measured network metric for a node in the region and the proximity information to the first node.

9. The method of claim 8, further comprising selecting a routing node for the region based on one or more of the at least one measured network metric and the proximity information.

10. A. method comprising:
    selecting a target node in a region in an overlay network, the overlay network being a logical representation of a physical network;
    determining a network condition to be monitored by the target node; and
    receiving at a source node a notification front the target node including a map for the region in response to the target node detecting tile network condition, the map including distances of each of a first plurality of nodes in the physical network to each of a second plurality of landmark nodes in the physical network, the first plurality of nodes comprising the source node and the target node and the landmark nodes being different from the first plurality of nodes.

11. The method of claim 10, wherein the notification further comprises at least one network metric associated with the target node.

12. The method of claim 11, wherein the network metric comprises at least one of nodes joining the region; nodes departing from the region; a lapsing of a predetermined period of time, a load of the target node, and a forward capacity of the target node.

13. The method of claim 11, further comprising determining a routing node for the region based on at least one of the map and the at least one network metric.

14. The method of claim 13, wherein determining a routing node for the region further comprises:
    determining a physically closest node closest to the source node in the physical network based on the map; and
    selecting the physically closest node as a routing node for the region.

15. A system comprises a first plurality of nodes connected via at least one physical network, wherein an overlay network logically represents the physical network of the system, the system comprising:
    a target node in a target region in the overlay network, the target node being operable to determine whether a predetermined network condition occurred and transmit a notification to a source node in response to the network condition on occurring; and
    the source node being operable to receive the notification comprising distances of each of the first plurality of nodes in the physical network to each of a second plurality of landmark nodes in the physical network, the first plurality of nodes comprising the source node, and the target node and the landmark nodes being different from the first plurality of nodes, and the source node being further operable to select a routing node in the target region based on the received notification.

16. The system of claim 15, wherein the routing node is a node in the target region physically closest to the source node.

17. The system of claim 15, wherein the notification comprises at least one network metric measured by the target node, the source node being operable to select the routing node based on the at least one network metric.

18. The system of claim 17, wherein the at least one network metric comprises at least one of nodes joining the target region; nodes departing from the target region; a lapsing of a predetermined period of time, a load of the target node, and a forward capacity of the target node.

19. The system of claim 15, wherein the source node is operable to transmit a message to the target node identifying the network condition.

20. The system of claim 15, wherein the overlay network comprises a distributed hash table overlay network.

21. The system of claim 20, wherein the overlay network comprises an cCAN overlay network, and the source node is an expressway routing node operable to select an expressway routing node in the region.

22. A node in an overlay network, wherein the overlay network is a logical representation of a physical network, the node comprising:
    means for selecting a target node in a target region in the overlay network;
    means for determining a network condition to be monitored by the target node; and
    means for receiving a notification from the target node including a map for the region, wherein the map includes distances of each of a first plurality of nodes in the physical network to each of a second plurality of landmark nodes in the physical network, the first plurality of nodes comprising the node and the target node, and the landmark nodes being different from the first plurality of nodes.

23. The node of claim 22, further comprising:
    means for determining first proximity information associated with a location of the node in the network;
    means for searching through the map using the first proximity information; and
    means for identifying a routing node in the target region based on the searching through the map, wherein the routing node is a node in the target region physically closest to the node relative to other nodes in the region.

24. The node of claim 23, wherein the node comprises means for storing a routing table, wherein the routing table includes information identifying the routing node.

25. The node of claim 22, wherein the notification further includes at least one measured network metric, and the means for identifying a routing node is operable to identify the routing node based on the at least one measured network metric.

* * * * *

UNITED STATES PATENT AND TRADEMARK OFFICE
CERTIFICATE OF CORRECTION

PATENT NO.         : 7,483,391 B2                                             Page 1 of 1
APPLICATION NO.    : 10/666620
DATED              : January 27, 2009
INVENTOR(S)        : Zhichen Xu et al.

It is certified that error appears in the above-identified patent and that said Letters Patent is hereby corrected as shown below:

In column 1, line 51, delete "byte" and insert -- by the --, therefor.

In column 1, line 57, delete "bash" and insert -- hash --, therefor.

In column 2, line 3, delete "die" and insert -- the --, therefor.

In column 2, line 7, delete "die" and insert -- the --, therefor.

In column 11, line 16, after "the" delete "is".

In column 12, line 41, in Claim 1, after "nodes" insert -- in --.

In column 12, line 56, in Claim 2, delete "muting" and insert -- routing --, therefor.

In column 13, line 2, in Claim 4, delete "filling" and insert -- falling --, therefor.

In column 13, line 22, in Claim 10, delete "A." and insert -- A --, therefor.

In column 13, line 28, in Claim 10, delete "front" and insert -- from --, therefor.

In column 13, line 30, in Claim 10, delete "tile" and insert -- the --, therefor.

In column 13, line 63, in Claim 15, after "condition" delete "on".

In column 14, line 27, in Claim 21, delete "cCAN" and insert -- eCAN --, therefor.

Signed and Sealed this

Twenty-sixth Day of May, 2009

JOHN DOLL
*Acting Director of the United States Patent and Trademark Office*